United States Patent Office 3,372,602
Patented Mar. 12, 1968

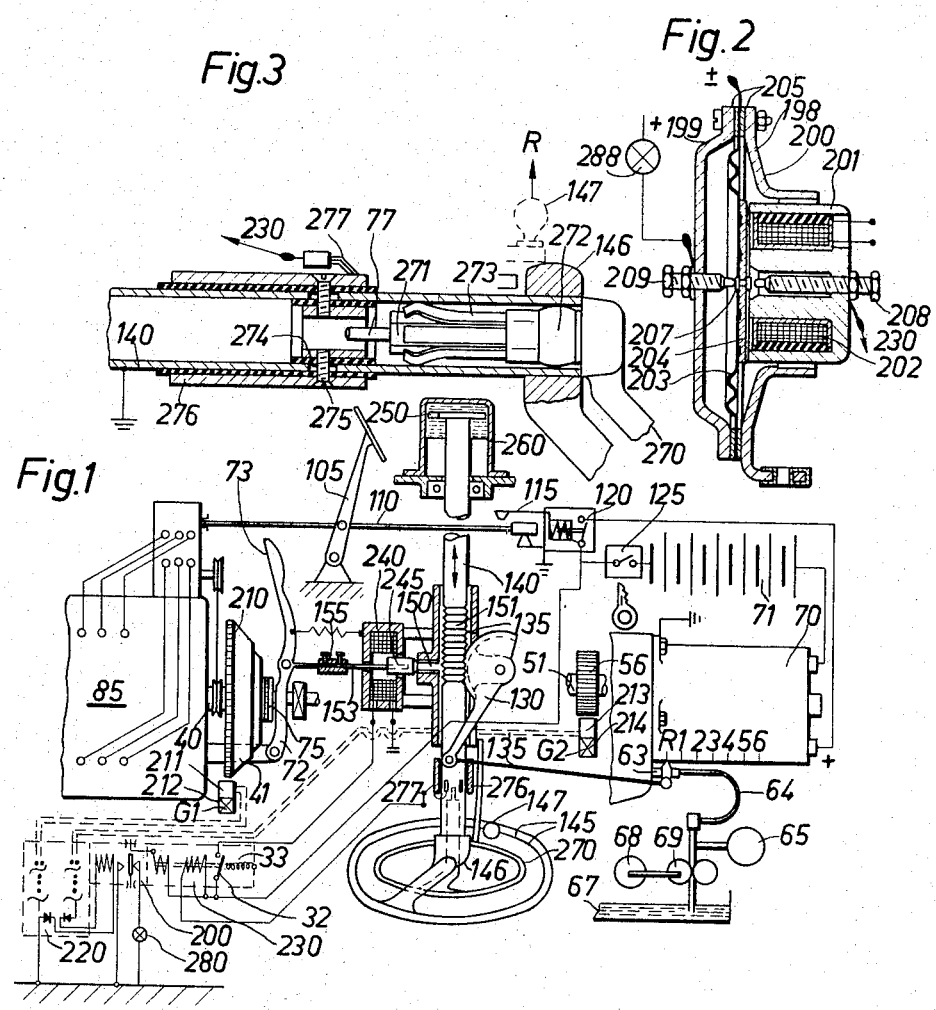

3,372,602
CLUTCH CONTROL APPARATUS
Hermann Papst, 7742 Black Forest,
St. Georgen, Germany
Continuation-in-part of application Ser. No. 308,622,
Sept. 11, 1963. This application May 26, 1966, Ser.
No. 553,204
20 Claims. (Cl. 74—339)

The present application is a continuation-in-part application of my copending application Ser. No. 308,622, filed Sept. 11, 1963 now Patent No. 3,253,475 entitled "Gear With Hydraulic Speed Selection."

The present invention relates to a clutch control apparatus for a transmission, and more particularly to apparatus for automatically controlling a clutch between an engine shaft and a transmission shaft to engage only when the engine shaft and transmission shaft rotate at the same speed.

During the shifting of the multistage transmission in a motor car, the engine shaft is separated from the transmission, and after the transmission has been shifted to another stage, the clutch is again engaged by the driver.

If there is a substantial speed difference between the transmission shaft and the engine shaft, the clutch slips and is subject to great wear.

It is one object of the invention to permit engagement of the clutch only when the engine shaft and the transmission shaft are synchronized.

Another object of the invention is to prevent the engagement of the clutch before a pair of transmission gears is in actual engagement.

It is another object of the invention to lock the gear transmission while the clutch is engaged so that no attempt can be made to shift the gears in the engaged condition of the clutch.

With these objects in view, the present invention relates to a clutch control apparatus for a transmission provided in a motor car between the engine and the wheel drive. One embodiment of the invention comprises a clutch between an engine shaft and a transmission shaft controlled by electromagnetic operating means; first and second generator means driven from the engine shaft and the transmission shaft, respectively, to produce first and second voltage respectively proportional to the rotary speeds of the two shafts and being supplied to differential control means including control switch means which are responsive to a difference between, and to equality of the first and second voltages to assume different switching positions for controlling the electromagnetic operating means to cause engagement or disengagement of the clutch; and a manual operable means, preferably a switch connected with the winding of the control means for actuating the control switch means so that the electromagnetic operating means disengage the clutch.

When the gear transmission is shifted to another stage so that the transmission shaft rotates at a different speed than the engine shaft, the driver varies the speed of the engine shaft by accelerating or decelerating the engine until the engine shaft rotates at the same speed as the transmission shaft.

As long as the two shafts rotate at different speeds, the control means receive different voltages so that the clutch is disengaged by the electromagnetic operating means. When substantial synchronization between the engine shaft and the transmission shaft is obtained, and the voltages are substantially equal, the control switch means causes engagement of the clutch.

In the preferred embodiment of the invention, the control means include a relay operating a control switch which is connected in series with the electromagnetic operating means. The relay has a first winding closed by the manually operated switch, and a second winding controlled by a switching device which responds to differences between, or equality of the voltages produced by the two generator means. Consequently, the manually operated switch can be released immediately after the control switch has been actuated and the clutch has been disengaged, since a speed difference between the engine and transmission shafts develops immediately after disengagement of the clutch so that the switching device responds to perform the function of the manually operated switch, holding the control switch in its actuated position.

In the preferred embodiment of the invention, the transmission is shifted by axial displacement of the steering wheel. The electromagnetic operating means has a movable part connected with the clutch for shifting the same, and this part cooperates with the locking means which permit engagement of the clutch only if the transmission is in one of its stages. The locking means cooperate with a locking part on a rod connected with the steering wheel and controlling the shifting of the gear transmission.

The manually controlled switch may be operated by a ring on the steering wheel, or by a button on a shift lever.

In one embodiment of the invention, the clutch is spring biassed to move to the engaged position, and is disengaged by the energized electromagnetic operating means. In another embodiment of the invention, in which an electromagnetic clutch is used, the clutch means is engaged when its electromagnetic operating means is energized. Consequently, the control switch is normally opened in the first embodiment, and normally closed in the second embodiment provided with an electromagnetic clutch.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is partially a schematic sectional perspective view, and partially an electric circuit diagram;

FIG. 2 is a sectional view illustrating on an enlarged scale a switching device used in the embodiment of FIG. 1;

FIG. 3 is a fragmentary sectional view illustrating on an enlarged scale a manually controlled switch used in the embodiment of FIG. 1;

Figure 4:
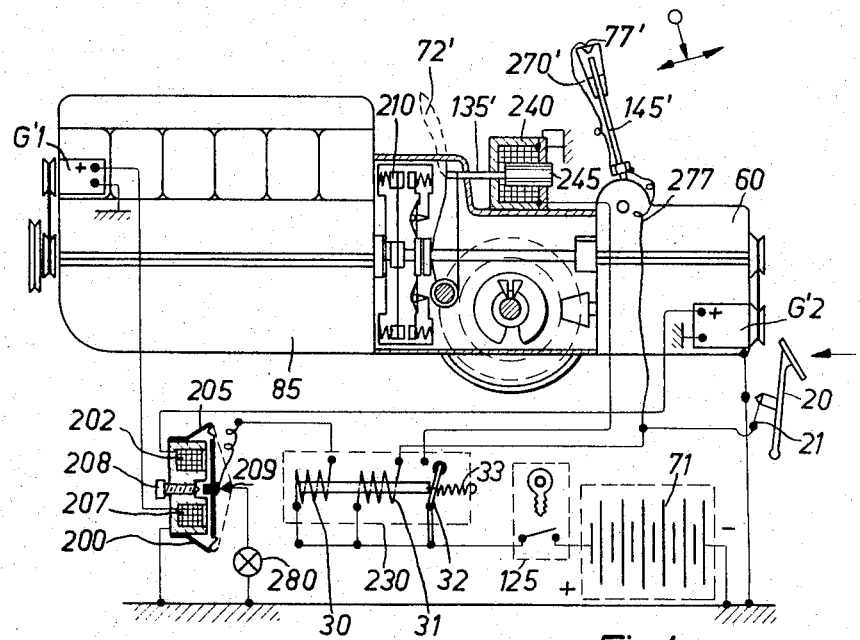
FIG. 4 is partially a schematic sectional view, and partially an electric circuit diagram illustrating another embodiment of the invention.

Referring now to the drawings, and more particularly to FIG. 1, a combustion engine 85 has an engine shaft 40 driving a transmission shaft 51 through a clutch 41. The clutch has two clutch parts, one of which is driven by engine shaft 40 and carries a gear 210, while the other part is actually shiftable over a thrust bearing 75 by lever 72 which can be either operated by a foot pedal 73, or by a rod 153 connected to the movable core 245 of an electromagnetic operating means which also includes a winding 240. An adjusting means 155 permits the adjustment of the length of rod 153.

Transmission shaft 51 carries a gear 56 and is connected with the shift gears of a transmission 60 which has an output shaft connected in the usual manner to the drive of the wheels of the motor car.

In the embodiment of FIG. 1, a steering wheel 145 has a hub portion 146 connected with a steering rod 140 which is mounted in a sleeve 139 of the steering column for axial and turning movement. Steering rod 140 has a series of annular teeth 151 meshing in all turned positions of steering wheel 145 with the teeth of a gear segment 130 which projects through a slot in sleeve 139 into engagement with the teeth 151, and has an arm connected by a link 135 to a shifting means 63 by which the gear transmission 60 is shifted between six stages, and a reverse drive, as indicated by indicia on the casing 70.

The gear transmission 60 is described in detail in the copending application Ser. No. 308,622, and is hydraulically controlled so that shifting means 63 is actually a tube through which pressure fluid from a container 65 and a flexible tube 64 is supplied to a control valve, not shown, by which the gear transmission is shifted. However, it will be understood that any standard gear transmission may be operated by link 135 and shifting means 63 to shift the transmission 60 between different stages in which the wheels of the car are rotated at different speeds for the same speed of transmission shaft 51. The casing 70 envelopes a starter motor which is connected to a battery 71, and can be started by actuation of a switch 125 by the ignition key ZS. A relay 120 has a switch which connects the battery into the circuit of the starter motor 70 only when contact rod 110 is shifted so that its contact engages contact 115. Contact rod 110 is shifted by a foot pedal 105 together with foot pedal 73 by which clutch 41 is shifted to a disengaged position. Consequently, the starter motor can be operated to start the engine only when clutch 41 is disengaged.

As explained above, clutch 41 is urged by a spring, not shown, to an engaged position, and shifted to the disengaged position when core 245 is moved to the left as viewed in FIG. 1 by the magnetic field of the energized winding 240. Core 245 is connected to a locking catch 150 which engages in a recess between two annular teeth 151 of the steering rod 140 when clutch 41 is in the engaged position. The arrangement is such that locking catch 150 can move into a recess only when gear segment 130 is in such a position as to cause proper meshing engagement between two gears of transmission 60. In the intermediate positions of shifting means 63, locking catch 150 cannot enter a recess, so that movement of clutch 41 into the engaged position is prevented until the gears of a gear stage engage. Locking catch 50 and annular teeth 151 serve as locking means preventing axial shifting of steering rod and consequent shifting of transmission 60, as long as clutch 41 is in the engaged position. Only if clutch 41 is disengaged by operation of foot pedal 73, or by energization of winding 240 of the electromagnetic operating means 240, 245, locking catch 150 releases annular teeth 151 so that the driver can shift steering wheel 145 with steering rod in axial direction for turning gear segment 130 and for shifting the gears.

In order to permit the driver to accurately shift the steering rod between axial positions corresponding to different gear stages, the end of steering rod 140 carries a damper piston 250 movable in a liquid in a closed cylinder 260.

As explained above, a gear 210 rotates with engine shaft 40, and a gear 56 rotates with transmission shaft 51. A first generator means G1 cooperates with gear 210, and a second generator means G2 cooperates with gear 56. Generator means G1 includes a winding 211, and a magnetic core 212 located in the proximity of gear 210 so that the flux of magnetic core 211 permeates the teeth of gear 210 so that impulses are produced in winding 211 whose voltage depends on the rotary speed of engine shaft 40.

Generator means G2 includes a winding 213 and a magnetic core 214, and is controlled by a gear 56 in the same manner so that the impulses produced in winding 213 have a voltage depending on the rotary speed of transmission shaft 51. The impulses produced in generator means G1 and G2 are supplied to an adjustable amplifier and rectifier 220 and thus transformed into two voltages which respectively represent the rotary speeds of the engine shaft 40 and the transmission shaft 51, the voltages being equal when engine shaft 40 and transmission shaft 51 rotate at the same speed. The voltages are supplied to the winding 202 of a switching device 200, best seen in FIG. 2. Switching device 200 is a relay having a cup-shaped magnetic core 201 of low remanence iron and a winding 202 surrounding the central portion of the core. A membrane 203 is clamped between two parts of the casing 199, 198 and carries an armature in the form of a circular disc 204 which carries a central contact 207 located between two adjustable contacts 208 and 209 which are respectively mounted on core 201 and housing part 199, and which can be adjusted to exactly determine the distances between the contacts 209, 207 and 208, which are preferably made of precious metal.

The cup-shaped magnet core 201 is arranged so that the air gap between armature disc 204 and magnetic core 201 is extremely thin, and is maintained at a minimum by a layer of varnish. After adjustment of the air gap, contact screw 208 is adjusted so that diaphragm contact 207 engages contact screw 208 at a certain minimum current produced by a selected difference between the voltages of generators G1 and G2. For example, at a voltage difference of 0.1 volt, a contact pressure of between 10 and 20 grams is produced between contacts 208 and 207, but as the voltage difference increases at different rotary speeds of engine shaft 40 and transmission shaft 41, for example, if the engine is raced while the car is at a standstill, a voltage difference of 9 volts may be produced, and the contact pressure may rise to several kilograms.

Below a minimum speed and voltage difference, contacts 207 and 208 separate, and contact 207 engages contact 209 which is connected over a signal lamp 280 to ground so that synchronization of the engine and transmission shafts is indicated by the signal lamp which remains illuminated when the clutch 41 is engaged.

Winding 202 includes two coils respectively connected to the amplifiers 220 of generators G1 and G2, and also connected to ground. A connector 205 is connected to contact 207 and to one end of a winding 30 of a relay 230 whose other end is connected over ignition switch 125 with the plus terminal of battery 71, as shown in FIG. 4 which illustrates a modification whose circuit is identical to the circuit of FIG. 1. Contact 208 is connected to ground, so that upon closing of contacts 207, 208, a current flows through the winding 30 of a relay 230 and causes closing of a control switch 32 which is normally held in an open position by a spring 33. When control switch 32 closes, a current flows from battery 71 to the winding 240 of electromagnetic operating means 240, 245 so that armature 245 is shifted to disengage clutch 40 by operation of the linkage 153, 72.

A second winding 31 of relay 230 is also connected to battery 71, and to a manually operated switch generally indicated at 77 and shown in detail in FIG. 3. In the embodiment of FIGS. 1 and 3, the manually operated switch 77 is actuated by a ring 270 mounted on the steering column, and which can be displaced by the thumb of the driver similar to the operation of the horn ring.

FIG. 3 shows the upper end of the steering rod 140 to which the hub 146 of the steering wheel 145 is secured. The manually operated ring 270 is fixed by means of the hexagonal shaft 271 and a collar 272 holds a set of springs 273 in resilient engagement with the faces of shaft 271 so that the device can be radially shifted. At the end of shaft 271 a contact 278 is mounted which enters into an insulated contact ring 274 connected by screws 275 to an insulated tubular contact 276 on which a brush contact 277 slides. Slide contact 277 is connected with winding 31.

The above described arrangement according to the present invention permits engagement of clutch 41 only when the rotary speed of engine shaft 40 is substantially equal to the rotary speed of transmission shaft 51. As long as shafts 40 and 51 rotate at different speeds, the voltages produced by the rotating gears 210 and 56 in generators G1 and G2 are different, so that winding 202 of switching device 200 is energized to close contacts 207, 208 and to interrupt the circuit of signal lamp 280 which indicates the engaged condition of the clutch.

Closing of contacts 207, 208 effects energizing of winding 30 of relay 230, and closing of control switch 32 so that winding 240 of the electromagnetic operating means 240, 245 is energized, and clutch 41 is disengaged by linkage 153, 72 operated by the core armature 245.

When clutch 41 is engaged, engine shaft 40 and transmission shaft 51 necessarily rotate at the same speed, and no voltage difference is produced so that contacts 207, 208 are separated, and contacts 207, 209 are closed and connect signal lamp 280 into the circuit of the battery.

When the driver intends to shift gears, he operates ring 270 so that manually operated switch 77 is closed, and connects winding 31 of relay 230 into the circuit of battery 71 so that switch 32 closes and connects the winding 240 of the electromagnetic operating means 240, 245 into the circuit so that core armature 245 is displaced to the left as viewed in FIG. 1, and linkage 153, 72 disengages clutch 41. Upon disengagement of the clutch, transmission shaft 51 will rotate at a different speed than engine shaft 40, and gears 210 and 56 will produce different voltages in the generators G1 and G2 so that the voltages supplied to winding 202 of switching device 200 are different. The voltage difference is sufficient to move diaphragm 204 so that contacts 207, 208 close, and connect the holding winding 30 of relay 230 to the battery so that the same is energized and holds control switch 72 in the closed position after manually operated switch 77 is released by the driver and opens. These switching operations take place in a few hundredths of a second. Since control switch 32 remains closed, clutch 41 remains disengaged while the driver shifts transmission 60 to another stage.

This is accomplished by moving steering wheel 145 with steering rod 140 in axial direction so that teeth 151 turn gear segment 130 and linkage 135 operates the shifting means 63 to engage another stage of transmission 60.

The axial displacement of steering rod 140 is possible since locking catch 150 is retracted from the locking recesses between teeth 151 when clutch 41 is disengaged, and armature 245 has been moved to the left as viewed in FIG. 1.

When the new gear stage is engaged, transmission shaft 51 rotates still at a different speed than engine shaft 40, and the voltage difference acting on switching means 200 acts on the electromagnetic operating means 240, 245 to hold the clutch in the disengaged position.

By operation of the gas pedal, the driver accelerates or decelerates the engine 85 until the engine shaft 40 moves substantially the same speed as transmission shaft 51, and the voltages produced by generators G1 and G2 are substantially equal so that no voltage difference acts on diaphragm 204 of switching device 200, and contacts 207, 208 are separated whereby winding 30 of relay 230 is de-energized, and control switch 32 is opened by spring 33, interrupting the connection of winding 240 to the battery, so that the clutch spring returns clutch 40 to its engaged position. Signal lamp 280 is extinguished during the gear shifting operation, and lights up when clutch 41 engages. As soon as clutch 41 is engaged, shafts 40 and 51 necessarily rotate at the same speed and relay 230 is de-energized so that electromagnetic operating means 240, 245 are also de-energized.

Due to the fact that the clutch is automatically engaged only when the engine and transmission shafts are completely synchronized by variation of the engine speed, the shifting of gears is extremely smooth, and the driving connection is established between the engine and the car without any jerks. No particular attention has to be given to the operation of the gas pedal or to the gear shifting operations.

In the event that the battery is exhausted, the clutch can be operated by foot pedal 73. When the car and engine are at a standstill, no voltages are produced by generators G1 and G2. When the engine rotates, or when the car rolls so that the engine shaft and transmission shaft have different rotary speeds, a small voltage difference is produced, and winding 30 of relay 230 is energized to close control switch 32 to hold the clutch disengaged until the engine shaft has substantially the same speed as the transmission shaft.

In order to start the engine in the disengaged position of clutch 41 in the arrangement in which no starter motor 70 is provided, a manual switch is connected in parallel to switch 125 for energizing one of the windings of relay 230.

Instead of two generators G1, G2 including cores and windings, a single generator can be used whose field magnet is rotated from engine shaft 40, and whose armature is rotated from transmission shaft 51 in the same direction as the field magnet. Slide rings and slide contacts are provided for transmitting the produced differential voltage, which is transformed and rectified over a diode bridge, and then supplied to the winding of the switching device 200. The opening of the contacts upon de-energization of switching device 200 effects the energization of the electromagnetic operating means of the clutch by a spring. On the other hand, when the rotary speeds are different, contacts 207, 208 close at a small difference of the rotary speed, and the circuit of the electromagnetic operating means is interrupted by the pulling action of the winding on the armature of relay 230.

The embodiment of FIG. 4 is very similar to the embodiment of FIG. 1 as far as the principle of operation is concerned. A friction clutch 41 is provided with an operating lever 72' moved by a rod 135' under the control of an armature 245. Instead of the generators described with reference to FIG. 1, two direct current generators G'1 and G'2 are provided which are respectively rotated by the engine shaft and the transmission shaft and are connected so that the voltages oppose each other and act, without amplification directly on switching device 200.

Instead of the steering wheel, a standard gear shift lever 145' is used for shifting the transmission, and has at its upper end, a manually operated handle 270' by which a switch 77' is closed, corresponding to the closing of switch 77 in the embodiment of FIG. 1. Switch 77' is connected to the winding 31 of relay 230.

When the driver grips the gear shift lever, he closes manually controlled switch 77', and effects closing of control switch 32 and disengagement of the clutch within a few hundredths of a second whereupon he can move the gear shift lever to shift the transmission 60 to a different stage. The difference between the speeds of the engine shaft and transmission shaft produces a voltage difference so that winding 30 of relay 230 is energized and holds control switch 32 closed after the driver has released switch 77'. By operation of the gas pedal, the engine is accelerated or decelerated until the shafts are synchronized and the clutch automatically engages since the voltage difference disappears. The driver does not have to pay any attention to the operation, and when the gear has been shifted, he releases the handle of the gear shift lever. Signal lamp 280 is extinguished when contacts 207, 208 close and energize relay winding 30, and when the voltage difference disappears, and control switch 32 opens so that the clutch is engaged, signal lamp is again illuminated by closing of contacts 208, 209.

A brake pedal 20 is provided for operating a switch 21 in the circuit of winding 31 so that the same is energized by the brake in the same manner as by the manually operated switch 77' to effect disengagement of the clutch so that the engine cannot be stalled by a braking operation.

Figure 5:
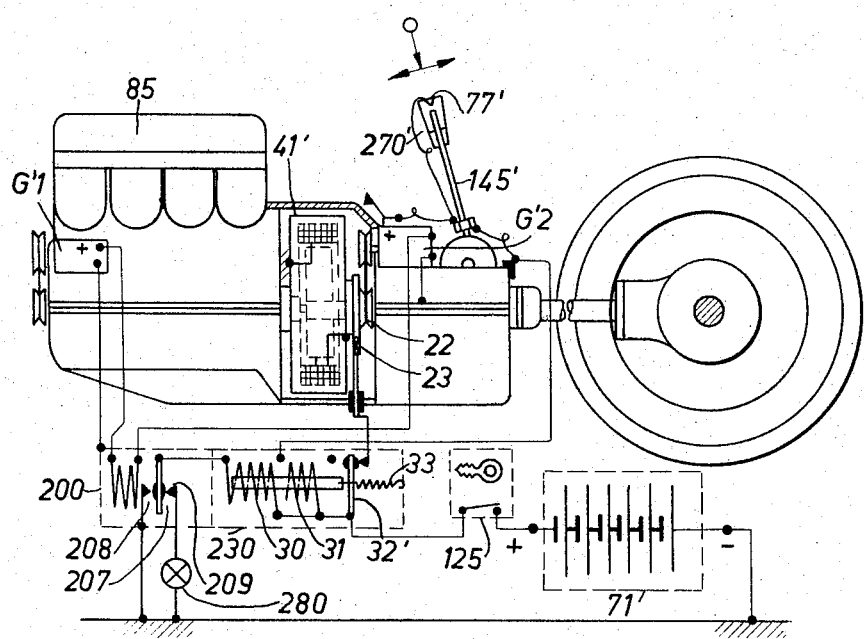
FIG. 5 is partially a schematic view, and partially an electric circuit diagram illustrating a further embodiment of the invention.

The embodiment of FIG. 5 operates on the same principle as the embodiments of FIGS. 1 and 4, and is similar to the embodiment of FIG. 4 inasmuch as a gear shift lever 77' and direct voltage generators G'1 and G'2 are driven by the engine and transmission shafts to supply differential voltages to the winding of switching means 200.

Instead of a friction clutch, an electromagnetic clutch 41' is provided whose electromagnetic operating means engage the clutch when energized, and disengage the clutch when de-energized. Consequently, control switch 32' is normally closed by spring 33, and when manually operated switch 77' is closed, and winding 31 of relay 230 is energized, control switch 32' opens and de-energizes the electromagnetic operating means so that clutch 41' opens. The same effect is obtained, when due to a voltage difference, switching device 200 closes contacts 207 and 208.

In a known magnetic clutch, which may be used in the embodiment of FIG. 5, the winding of the electromagnetic operating means of the clutch rotates, and magnetic powder and oil are located in the air gap. One end of the winding is connected to ground, and the other to a slide ring 22 whose slide contact 23 is connected with a contact of control switch 32'.

It will be understood that each of the elements described above, or two or more together, may also find a useful application in other types of clutches and transmissions differing from the types described above.

While the invention has been illustrated and described as embodied in a clutch control apparatus for permitting engagement of a clutch upon synchronization of the engine shaft with a transmission shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Clutch control apparatus for a transmission, comprising, in combination, an engine shaft means; a transmission shaft means adapted to be connected with a transmission; clutch means connecting said engine shaft means and transmission shaft means; electromagnetic operating means for operating said clutch means; first and second generator means driven from said engine shaft means and said transmission shaft means, respectively, to produce first and second voltages respectively proportional to the rotary speeds of said shaft means; differential control means receiving said first and second voltages and including control switch means having open and closed switching positions and being responsive to a difference between, and to equality of said first and second voltages to assume one or the other of said switching positions, said control switch means being connected into the circuit of said electromagnetic operating means to energize and de-energize the same in said switching positions, respectively, so as to cause engagement or disengagement of said clutch means; and a manually operable means connected with said control means for actuating said control switch means and thereby said electromagnetic operating means to disengage said clutch means so that said engine shaft means and said transmission shaft means rotate at different speeds and said control means receive different voltages so that said control switch means cause said clutch means to remain disengaged until said engine shaft means and said transmission shaft means rotate at substantially the same speed and said voltages are substantially equal whereupon said control switch means causes engagement of said clutch means.

2. Clutch control apparatus according to claim 1 wherein said differential control means includes switching means having winding means and contact means controlled by said winding means; wherein said winding means receives said first and second voltages; and wherein said contact means are actuated when the difference between said first and second voltages exceeds a predetermined minimum.

3. Clutch control apparatus according to claim 1 wherein said differential control means include switching means having winding means and contacts controlled by said winding means, and a control relay having first and second relay windings, said first and second relay windings controlling said control switch means; wherein said winding means receive said first and second voltages; wherein said contacts are located in the circuit of said first winding so that the same is energized when the difference between said first and second voltages exceeds a predetermined minimum; and wherein said manually operable means include a manually controlled switch connected into the circuit of said second relay winding; said first and second relay windings actuating said control switch means.

4. Clutch control apparatus according to claim 3 including a steering wheel; and wherein said manually operable means include a member mounted on said steering wheel and connected with said manually controlled switch for operating the same.

5. Clutch control apparatus according to claim 3 and including a gear shift lever; and wherein said manually operable means include a member mounted on said gear shift lever for operating said manually controlled switch.

6. Clutch control apparatus according to claim 1 and including a steering wheel; wherein said differential control means include a relay winding controlling said control switch means; and wherein said manually operable means include a member mounted on said steering wheel, and a manually operated switch controlled by said member and connected into the circuit of said relay winding so that said control switch means can be actuated by said member.

7. Clutch control apparatus according to claim 1 including steering rod mounted for turning and longitudinal movement; a manually operated steering member secured to said steering rod for turning and longitudinally moving the same; shifting means for shifting the transmission between the stages of the same; and linkage means connecting said steering rod with said gear shifting means so that axial displacement of said steering rod causes shifting of the transmission.

8. Clutch control apparatus according to claim 7 wherein said steering rod has a set of annular teeth; and wherein said linkage means include a gear meshing with said teeth and turning upon axial displacement of said steering rod, and a linkage connecting said gear with said shifting means.

9. Clutch control arrangement according to claim 8 and including locking means operatively connected with said clutch means and cooperating with said annular teeth on said steering rod so that said clutch means is locked in its disengaged condition during the shifting of the transmission by said steering rod; and wherein said locking means is located in one of the recesses between said annular teeth in the engaged condition of said clutch means so that said steering rod is arrested in any one of the stages of the transmission.

10. Clutch control apparatus according to claim 1 including shifting means for shifting the transmission between several stages; and locking means operatively connecting said shifting means with said clutch means to hold said clutch means in a disengaged condition during the shifting of the transmission.

11. Clutch control apparatus according to claim 1 wherein said clutch means includes a friction clutch and spring means for urging said friction clutch to an engaged position; and wherein said electromagnetic means include a winding connected in series with said control switch means, and an armature connected with said clutch so that upon energization of said winding said clutch is shifted to a disengaged position.

12. Clutch control apparatus according to claim 11 wherein said differential control means include means responsive to a voltage difference between said first and second voltages to close said control switch means, and a relay winding for closing said control switch means when energized; and wherein said manually operable means include a manually controlled switch connected into the circuit of the relay winding for closing said control switch means so that said winding of said electromagnetic operating means is energized and moves said clutch to said disengaged position whereupon said first and second generator means are driven at different speeds and produce different first and second voltages whereby said clutch is maintained in the disengaged condition after opening of said manually controlled switch, and until the speed of said engine shaft means is varied to correspond substantially to the speed of said transmission shaft means.

13. Clutch control apparatus according to claim 1 wherein said clutch means includes an electromagnetic clutch; wherein said electromagnetic operating means form part of said clutch means and include a winding for placing said electromagnetic clutch in the engaged condition when said winding is energized; and wherein said winding is connected with said control switch means; and wherein said control switch means is normally closed to energize said winding, and is opened by said differential control means when the difference between said first and second voltages exceeds a predetermined minimum.

14. Clutch control apparatus according to claim 13 and including a relay winding controlling said control switch means; and wherein said manually operable means include a manually controlled switch connected with said relay winding for energizing the same so that upon closure of said manually controlled switch, said control switch means is opened whereby said winding of said electromagnetic operating means is de-energized so that said electromagnetic clutch is disengaged whereby said engine shaft means and transmission shaft means are separated and rotate at different speeds so that said differential control means receive different first and second voltages and maintain said control switch means open until the speed of said engine shaft means is varied to be substantially the same as the speed of the transmission shaft means.

15. Clutch control apparatus according to claim 1 and including first and second gears respectively secured to said engine shaft means and transmission shaft means; and wherein said first and second generator means respectively include first and second magnetic impulse generators located in close proximity to said first and second gears so that during rotation of said engine shaft means and transmission shaft means the magnetic flux of said magnetic impulse generators is influenced and impulses are produced; including first and second amplifiers for amplifying said impulses produced by said first and second magnet impulse generators; and wherein said dif-ferential control means includes a winding receiving said first and second amplified impulses, and contact means operated when the voltage difference between said first and second impulses exceeds a predetermined difference.

16. Clutch control apparatus according to claim 1 wherein said first and second generator means are first and second direct current generators connected with said engine shaft means and transmission shaft means, respectively, for rotation; and wherein said differential control means include a winding receiving first and second voltages in counteraction from said generator, and contact means controlled by said winding so that said contact means are operated when the difference between the first and second voltages produced by said first and second generators exceeds a predetermined minimum difference.

17. Clutch control apparatus according to claim 1 wherein said differential control means include a winding receiving said first and second voltages, and normally closed contacts controlled by said winding to open when the difference between said first and second voltages exceeds a predetermined minimum difference, said differential control means further including relay means having first and second windings for operating said control switch means, said first winding being connected with said contacts; wherein said manually operable means include a manually controlled switch located in the circuit of said second winding of said relay means so that said control switch means is operated upon actuation of said manually controlled switch; and including a source of current connected into the circuit of said windings and of said control switch means and contacts.

18. Clutch control apparatus according to claim 17 wherein said differential control means include another pair of contacts, and a signal lamp connected in series with said other pair of contacts, said other pair of contacts being normally closed to illuminate said signal lamp, and opening when said winding closes said first mentioned contacts.

19. Clutch control apparatus according to claim 1 and including a steering wheel and a steering column; wherein said differential control means include a relay winding controlling said control switch means; wherein said manually operable means include a manually operated ring member on said steering wheel, and a switch controlled by said manually operated member and located in said steering column, said switch being connected with said relay winding so that said control switch means can be operated by actuation of said manually operated member on said steering wheel.

20. Clutch control apparatus according to claim 19 and including shifting means for shifting said transmission; wherein said steering wheel is turnable and movable in axial direction; and including linkage means connecting said steering wheel with said gear shifting means so that during movement of said steering wheel in axial direction, said shifting means shifts the transmission between different stages.

References Cited

UNITED STATES PATENTS

| | | | |
|---|---|---|---|
| 3,077,121 | 2/1963 | Schaub | 192—3.5 |
| 3,103,826 | 9/1963 | Jaeschke | 74—339 |
| 3,253,475 | 5/1966 | Papst | 74—365 |
| 3,335,830 | 8/1967 | De Castelet | 74—365 |

DONLEY J. STOCKING, *Primary Examiner.*

H. S. LAYTON, *Assistant Examiner.*